No. 790,841. Patented May 23, 1905.

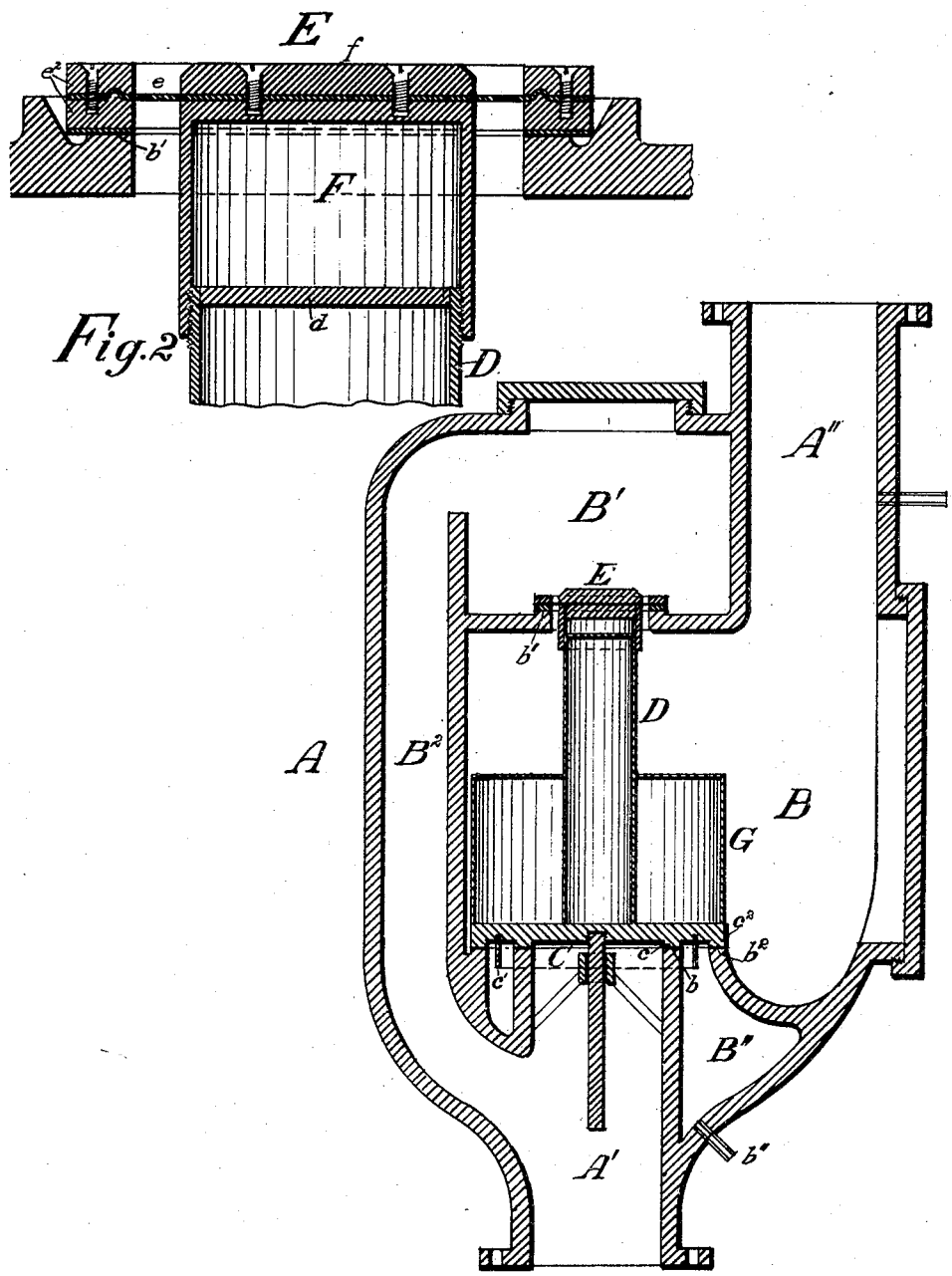

UNITED STATES PATENT OFFICE.

JARVIS HUNT, OF CHICAGO, ILLINOIS, ASSIGNOR TO PHOENIX FIRE EXTINGUISHER CO., OF CHICAGO, ILLINOIS, A CORPORATION OF NEW JERSEY.

VALVE FOR AUTOMATIC FIRE-EXTINGUISHERS.

SPECIFICATION forming part of Letters Patent No. 790,841, dated May 23, 1905.

Application filed January 11, 1904. Serial No. 191,317.

*To all whom it may concern:*

Be it known that I, JARVIS HUNT, a citizen of the United States, residing at Chicago, in the county of Cook and State of Illinois, have invented certain new and useful Improvements in Valves for Automatic Fire-Extinguishers, of which the following is a specification.

The present invention relates to what is known in the art as the "main valve" of a dry-pipe automatic fire-extinguisher.

The object of the invention is to provide an improved valve of this type in which simplicity of construction and efficiency in operation are combined. More particularly stated, one object of the invention is to provide a valve of the class stated upon which the effect of water-hammer is reduced to a minimum.

Another object of the invention is to provide a valve of the class described which cannot by any possibility become "columned."

Other objects of the invention will appear hereinafter.

The invention consists in the features of novelty that are hereinafter described with reference to the accompanying drawings, which are made a part of this specification, and in which—

Figure 1 is a vertical section of a valve embodying the invention. Figure 2 is a section on a somewhat larger scale of one of the valves proper or cut-offs.

A represents the casing having an inlet A', adapted for connection with the street-main or other source of water-supply, and an outlet A'', adapted for connection with the riser of the system. Within the casing are chambers B, B', and B''. The chamber B' is connected with the inlet by means of a by-pass $B^2$, so that the pressure in the chamber B' is the same as the pressure in the inlet A'.

From the inlet A' a port surrounded by a valve-seat $b$ opens into the chamber B'', and from the chamber B' a port surrounded by a valve-seat $b'$ opens into the chamber B. The chamber B'' is maintained at atmospheric pressure through a leak-hole $b''$, said chamber being hereinafter called the "low-pressure" chamber. The low-pressure chamber is in turn surrounded by a valve-seat $b^2$, which is concentric with the seat $b$.

C represents a valve-disk or cut-off provided on its under side with two concentric seating surfaces or valves $c$ and $c^2$, which are adapted to the seats $b$ and $b^2$, respectively. So much of the disk C as is bounded by the surface $c$ confines the water in the inlet and is hereinafter called the "main water-valve," while that portion of the disk lying between the surfaces $c$ and $c^2$ closes communication between the chamber B'' and the inlet A' and chamber B, so that the chamber B'' is maintained at low-pressure, and is hereinafter called the "air-valve." Rising from the disk C is a hollow stem D, which carries at its upper end a valve E, adapted to the seat $b'$. This valve is constructed as shown more clearly in Fig. 2. The upper end of the hollow stem D is closed by a cap, and to the stem is secured a head F. Imposed upon this head is a flexible diaphragm $e$, which is perforated for the passage of the screws of a clamping-plate $f$, by which the diaphragm is held in place. The outer margin of the diaphragm is clamped between two rings $e^2$, which are securely held together by screws, the lower ring being provided with a seating-surface adapted to the valve-seat $b'$. If desired, the members between which the diaphragm is clamped may have complementary annular ribs and grooves and the diaphragm a corresponding corrugation, so that the several parts will "nest." A packing of lead or other material may also be placed in the grooves and between the clamping members to insure tight joints.

Superimposed upon the disk C is a hollow air-tight dome G, which, together with said disk and the hollow stem D, constitutes a float having sufficient buoyancy to hold the valves in elevated position when once unseated and the chamber B filled with water.

It will be observed that the valves $c$ and E are differential, the area of the main water-valve $c$, exposed to the water-pressure in the inlet A', being greater than the area of the valve E, exposed to water-pressure in the chamber B'. As a result of this there will be a preponderance of pressure upward against the main water-valve, tending to unseat it. The differential of these two valves is preferably such that the preponderating pressure is very slight; but the extent of this differential must be left to the discretion of the builder and will be determined in each case by the conditions to be met. It will be observed, however, that in any event water-hammer will operate in both directions upon the main water-valve, so that it is only the preponderance of this pressure that has to be dealt with in preventing the escape of water past the main water-valve. This is easily overcome by a comparatively low air-pressure in the system acting downward upon the disk C, which, as before seen, comprises differential valves, the area exposed to the water-pressure being less than the area exposed to the air-pressure. Should any water escape past the valve c, it will impinge against the depending flange c' and will be precipitated in the low-pressure chamber, eventually escaping through the leak-hole b''.

It is well understood in the art that where two valves are connected by a stem in the manner shown means must be provided for compensating inequalities in expansion and contraction. It is for this reason that I make the valve E flexible, so that its inner portion may move independently of the portion which bears upon the seat b'. It is impossible to column this valve, because of its buoyancy and the flexibility of the valve E. It is manifest that when once fairly unseated, so that the pressure is equal on all parts of it, its buoyancy will hold it unseated. It is also manifest that should a column of water accumulate in the riser and produce a hydrostatic pressure in excess of the pressure in the main one of two things will take place—namely, the valve E will be lifted, and thereby lift the disk C, or else the valve E will be flexed so as to unseat its outer portion and allow the excess pressure to pass into the chamber B'. There would eventually come a time when the pressure on all of the parts C, D, E, and G would become equal, or substantially so, and in this event the float will rise by reason of its buoyancy.

It will be seen that upon the unseating of the water-valves water will enter through the annular space around the stem D. This annular stream of water will form a water-cushion between the float and the top wall of the casing, and this, supplemented by the pressure of the water on the top of the valve E, will prevent the float from being forced against the top of the casing with an injurious impact.

I disclaim as my invention the combination, with a casing having a chamber and provided with two ports opening thereinto for the admission of water and a port opening therefrom for the escape of water to the system, of two valves, differential or otherwise, for controlling the water-inlet ports, one of said valves seating with and the other against the water-pressure, the preponderance, if any, being in favor of the valve seating against the water-pressure, intervening mechanism through the medium of which said valves oppose each other with a counterbalancing effect, and means controlled by the pressure in the system for overcoming said preponderance and holding the valves normally seated, whereby when the pressure in the system is reduced the pressure of the water will automatically unseat said valves.

What I claim as new is—

1. In a device of the class described, the combination with a casing having two inlet-ports communicating with the water-supply, of two valves for controlling said ports, one seating with and the other against the water-pressure, the one seating against the pressure having a greater area exposed to the pressure, means connecting said valves, and means controlled by the pressure in the system for holding the valves seated, substantially as described.

2. In a device of the class described, the combination with the casing having two inlet-ports communicating with the water-supply, of two valves for controlling said ports, one seating with and the other against the pressure, means connecting said valves, a float connected to the valve seating against the water-pressure, and means controlled by the pressure in the system for assisting in holding the valves seated, substantially as described.

3. In a device of the class described, the combination with the casing having two inlet-ports communicating with the water-supply, a low-pressure chamber, and a chamber under the pressure in the system, of differential valves for controlling the inlet-ports, one seating with and the other against the water-pressure, the one seating against the pressure being of greater area, means connecting the aforesaid inlet-valves, and a valve for controlling communication between the low-pressure chamber and the chamber under system pressure, substantially as described.

4. In a device of the class described, the combination with a casing having two inlet-ports communicating with the water-supply, of two valves for controlling said ports, one seating with and the other against the water-pressure, the one seating against the pressure having the larger area exposed to the pressure, a stem connecting said valves and extending through the smaller port, said stem being smaller than said port whereby an annular space is left for the admission of water around it, and means under the control of the pressure in the system for assisting in holding the valves seated, substantially as described.

5. In a device of the class described, the combination with a casing having a main water-inlet, a second water-inlet, and a low-pressure chamber of a valve seating against the pressure for controlling the main water-inlet, a valve seating with the pressure for controlling the second water-inlet, a stem connecting said valves, and a valve exposed to the air in the system for controlling communication between the low-pressure chamber and the system, substantially as described.

6. In a device of the class described, the combination with a casing having a main water-inlet, a second water-inlet, an air-chamber in communication with the system, a low-pressure chamber intermediate of the main water-inlet and air-chamber, a valve-seat surrounding the main inlet, and a second valve-seat, concentric with the first, between the low-pressure chamber and the air-chamber, of a disk having differential valves adapted to said seats respectively, a valve of smaller area seating with the pressure for controlling the second water-inlet, and a stem connecting the valve last aforesaid and disk, substantially as described.

7. In a device of the class described, the combination with the casing having a chamber communicating with the system and oppositely-arranged ports communicating with said chamber and also with the water-supply, of connected differential valves for normally closing the said ports, the valve for controlling the main water-inlet port having greater areas exposed to both the water-pressure and the air-pressure, substantially as described.

8. In a device of the class described, the combination with the casing having a chamber communicating with the system and two ports connecting said chamber with the water-supply, of two valves for controlling said ports, one seating with the water-pressure and the other seating against the water-pressure, the valve seating against the water-pressure having the greater area exposed thereto, and means controlled by the pressure in the system for holding said valve seated in opposition to the preponderance of the water-pressure against it, substantially as described.

9. In a device of the class described, the combination with the casing having a chamber normally in communication with the system and two ports communicating therewith and with a source of water-supply, of two valves for controlling said ports, one seating with and the other against the water-pressure, means through which said valves react upon each other, and means controlled by the pressure in the system for holding the valves seated, substantially as described.

10. In a device of the class described, the combination with a casing having an outlet through which the water escapes to the riser of the system and two ports communicating with said chamber and with a source of water-supply, of two valves for controlling said ports, said valves having differential areas exposed to the water-pressure and to the pressure in said chamber, means through which said valves react upon each other, and means controlled by the pressure in the system for holding the valves normally seated, substantially as described.

11. In a device of the class described, the combination with a casing having a chamber, an outlet through which water passes therefrom to the riser of the system, and two ports communicating therewith and with a source of water-supply, of two valves for controlling said ports, means through which said valves react upon each other, means whereby the water-pressure automatically unseats said valves upon a reduction of the pressure in the system, and means controlled by the pressure in the system for normally holding said valves seated, substantially as described.

JARVIS HUNT.

Witnesses:
HOWARD W. BAKER,
L. M. HOPKINS.